US008563861B2

(12) United States Patent
Van Swearingen et al.

(10) Patent No.: US 8,563,861 B2
(45) Date of Patent: Oct. 22, 2013

(54) FRICTION WELD INNER CONDUCTOR CAP AND INTERCONNECTION METHOD

(75) Inventors: Kendrick Van Swearingen, Woodridge, IL (US); Ronald A. Vaccaro, Shorewood, IL (US)

(73) Assignee: Andrew LLC, Hickory, NC (US)

( * ) Notice: Subject to any disclaimer, the term of this patent is extended or adjusted under 35 U.S.C. 154(b) by 147 days.

(21) Appl. No.: 12/974,765

(22) Filed: Dec. 21, 2010

(65) Prior Publication Data

US 2012/0125654 A1 May 24, 2012

Related U.S. Application Data

(63) Continuation-in-part of application No. 12/951,558, filed on Nov. 22, 2010.

(51) Int. Cl.
*H02G 15/02* (2006.01)
*H02G 15/08* (2006.01)
*H01R 9/05* (2006.01)

(52) U.S. Cl.
USPC .............................. 174/82; 439/578; 439/581

(58) Field of Classification Search
USPC ......... 174/82, 88 C, 84 R, 88 S, 91; 439/578, 439/584, 888, 580, 582, 879, 581; 361/119, 361/730
See application file for complete search history.

(56) References Cited

U.S. PATENT DOCUMENTS

| | | | | |
|---|---|---|---|---|
| 3,295,095 | A * | 12/1966 | Kraus | 439/578 |
| 3,384,703 | A * | 5/1968 | Forney, Jr. et al. | 174/75 C |
| 4,039,244 | A * | 8/1977 | Leachy | 439/887 |
| 4,746,305 | A | 5/1988 | Nomura | |
| 5,046,952 | A | 9/1991 | Cohen et al. | |
| 5,137,470 | A | 8/1992 | Doles | |
| 5,167,533 | A | 12/1992 | Rauwolf | |
| 5,186,644 | A | 2/1993 | Pawlicki et al. | |
| 5,299,939 | A | 4/1994 | Walker et al. | |
| 5,354,217 | A | 10/1994 | Gabel et al. | |
| 5,545,059 | A | 8/1996 | Nelson | |
| 5,561,900 | A | 10/1996 | Hosler, Sr. | |
| 5,722,856 | A | 3/1998 | Fuchs et al. | |
| 5,775,934 | A | 7/1998 | McCarthy | |
| 5,823,824 | A | 10/1998 | Mitamura et al. | |
| 5,830,009 | A | 11/1998 | Tettinger | |

(Continued)

FOREIGN PATENT DOCUMENTS

EP 0629025 12/1994

OTHER PUBLICATIONS

Sung Hee Kim, International Search Report from related PCT filing PCT/US/2011/046050, Seo-Gu, Daejeon, Republic of South Korea, Feb. 9, 2012.

*Primary Examiner* — Chau Nguyen
*Assistant Examiner* — Roshn Varghese
(74) *Attorney, Agent, or Firm* — Babcock IP, PLLC

(57) ABSTRACT

An inner conductor cap, with a connector end and a cable end, is provided with an inner conductor socket at the cable end and an inner conductor interface at the connector end. The inner conductor socket may be dimensioned to mate with a prepared end of an inner conductor of a coaxial cable. At least one material gap may be provided between a sidewall of the inner conductor socket and an outer diameter surface of the prepared end when the inner conductor cap is mated with the prepared end. A rotation key may be provided for rotating the inner conductor cap.

11 Claims, 9 Drawing Sheets

(56) References Cited

U.S. PATENT DOCUMENTS

| | | | |
|---|---|---|---|
| 6,133,532 A | 10/2000 | Lundback et al. | |
| 6,332,808 B1 | 12/2001 | Kanda et al. | |
| 6,361,364 B1 * | 3/2002 | Holland et al. | 439/578 |
| 6,471,545 B1 | 10/2002 | Hosler, Sr. | |
| 6,607,399 B2 | 8/2003 | Endo et al. | |
| 6,752,668 B2 | 6/2004 | Koch, Jr. | |
| 6,793,095 B1 | 9/2004 | Dulisse et al. | |
| 6,814,625 B2 | 11/2004 | Richmond et al. | |
| 6,932,644 B1 | 8/2005 | Taylor | |
| 7,044,785 B2 | 5/2006 | Harwath et al. | |
| 7,067,739 B2 * | 6/2006 | Ashibe et al. | 174/84 R |
| 7,144,274 B2 | 12/2006 | Taylor | |
| 7,217,154 B2 | 5/2007 | Harwath | |
| 7,448,906 B1 | 11/2008 | Islam | |
| 7,520,779 B2 | 4/2009 | Arnaud et al. | |
| 7,607,942 B1 | 10/2009 | Van Swearingen | |
| 7,798,847 B2 | 9/2010 | Islam | |
| 7,819,698 B2 | 10/2010 | Islam | |
| 2010/0261361 A1 | 10/2010 | Kasparian et al. | |

* cited by examiner

FRICTION WELD INNER CONDUCTOR CAP AND INTERCONNECTION METHOD

CROSS REFERENCE TO RELATED APPLICATIONS

This application is a continuation-in-part of commonly owned co-pending U.S. Utility patent application Ser. No. 12/951,558, titled "Laser Weld Coaxial Connector and Interconnection Method", filed Nov. 22, 2010 by Ronald A. Vaccaro, Kendrick Van Swearingen, James P. Fleming, James J. Wlos and Nahid Islam, currently pending and hereby incorporated by reference in its entirety.

BACKGROUND

1. Field of the Invention

This invention relates to electrical cable connectors. More particularly, the invention relates to an inner conductor cap for interconnection with an inner conductor of a coaxial cable as an inner contact of a coaxial connector.

2. Description of Related Art

Coaxial cable connectors are used, for example, in communication systems requiring a high level of precision and reliability. To create a secure mechanical and optimized electrical interconnection between the cable and the connector, prior coaxial connectors have utilized circumferential contact between a leading edge of the coaxial cable outer conductor and the connector body, such as a flared end of the outer conductor that is clamped against an annular wedge surface of the connector body, via a coupling nut.

With the outer conductor mechanically secured, the inner conductor is often allowed to longitudinally float, electrically contacted by a bias-type contact mechanism such as spring fingers engaging the inner conductor along an outer diameter surface, or, if the inner conductor is hollow, along an inner sidewall of the inner conductor bore. Representative of this technology is commonly owned U.S. Pat. No. 6,793,529 issued Sep. 21, 2004 to Buenz.

Alternatively, prior coaxial connectors have provided mechanical interconnections between the inner conductor and the inner contact via a thread-driven radial expansion and/or direct threading of the inner contact into the bore of a hollow inner conductor. The threaded elements and/or screws required for these configurations may increase manufacturing costs and/or installation complexity.

Connectors configured for permanent interconnection via solder and/or adhesive interconnection are also well known in the art. Representative of this technology is commonly owned U.S. Pat. No. 5,802,710 issued Sep. 8, 1998 to Bufanda et al. However, solder and/or adhesive interconnections may be difficult to apply with high levels of quality control, resulting in interconnections that may be less than satisfactory, for example when exposed to vibration and/or corrosion over time.

The environmental seals in prior coaxial connectors are typically located around entry paths through the connector body and therefore do not protect the electrical interconnection between the inner conductor and the inner contact from any moisture which (a) may migrate past environmental seals of the connector body, (b) is sealed within the connector during installation and/or (c) may migrate to the electrical interconnection area along the inside of the coaxial cable. An installation error and/or failure of any one of these seals may allow moisture and/or humid air to enter the connection areas of the connector where it can pool and cause corrosion resulting in significant performance degradation of the electrical connections.

A solution in the prior art is to apply dedicated interconnection seals around the inner conductor and inner contact interconnection, for example as disclosed in commonly owned U.S. Pat. No. 7,819,698 issued on Oct. 26, 2010, to Islam. However, additional seals further complicate manufacture and/or installation.

Competition in the coaxial cable connector market has focused attention on improving electrical performance and long term reliability of the cable to connector interconnection. Further, reduction of overall costs, including materials, training and installation costs, is a significant factor for commercial success.

Therefore, it is an object of the invention to provide an inner conductor cap and method of interconnection with an inner conductor of a coaxial cable that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Aluminum has been applied as a cost-effective alternative to copper for conductors in coaxial cables. The inventors have identified several difficulties arising from the interconnection of aluminum inner conductor coaxial cable configurations with prior coaxial cable connectors having inner contact configurations. Aluminum oxide surface coatings quickly form upon air-exposed aluminum surfaces that may degrade traditional mechanical, solder and/or conductive adhesive interconnections. Further, prior coaxial connector mechanical interconnection inner contact configurations are generally incompatible with aluminum inner conductors due to the creep characteristics of aluminum. Galvanic corrosion between the aluminum inner conductor and a dissimilar metal of the inner contact, such as bronze, brass or copper, may contribute to accelerated degradation of the electro-mechanical interconnection.

The inventors have recognized that deficiencies in the prior aluminum inner conductor to inner contact interconnections may be obviated by providing an inner conductor cap inner contact dimensioned for friction welding to the inner conductor, enabling a molecular bond interconnection with inherent resistance to corrosion and/or material creep interconnection degradation.

Figure 1:
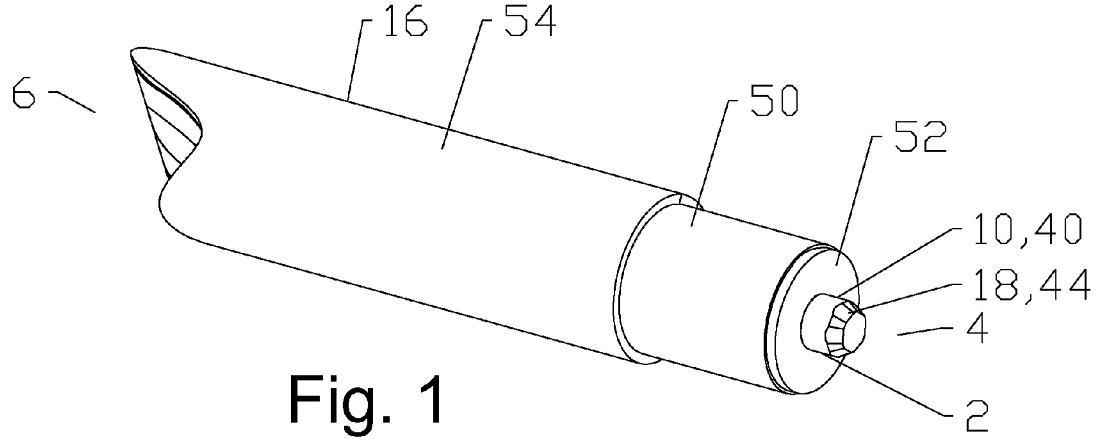
FIG. 1 is a schematic isometric view of an exemplary embodiment of an inner conductor cap with a rotation key formed as male protrusion end facets installed upon the prepared end of coaxial cable.
Figure 2:
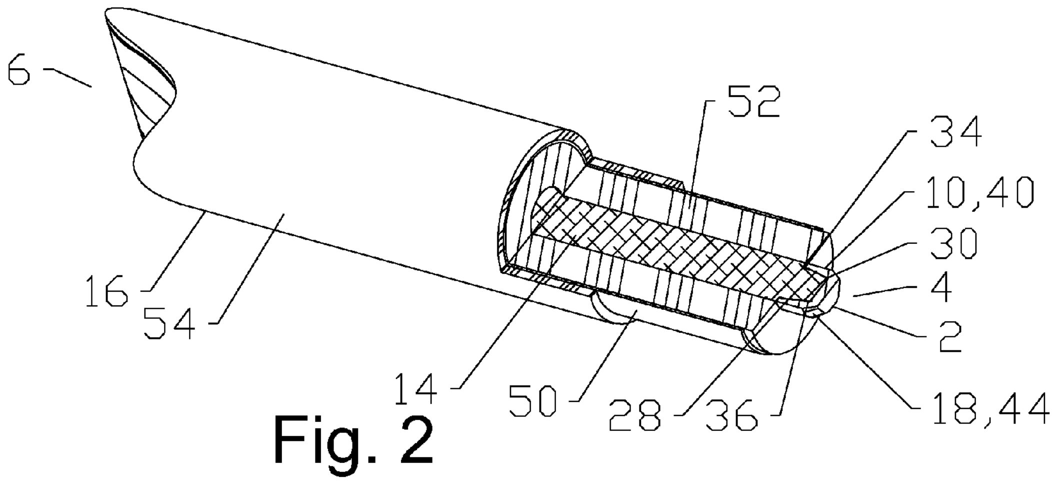
FIG. 2 is a schematic isometric partial cross-section view of FIG. 1.
Figure 3:
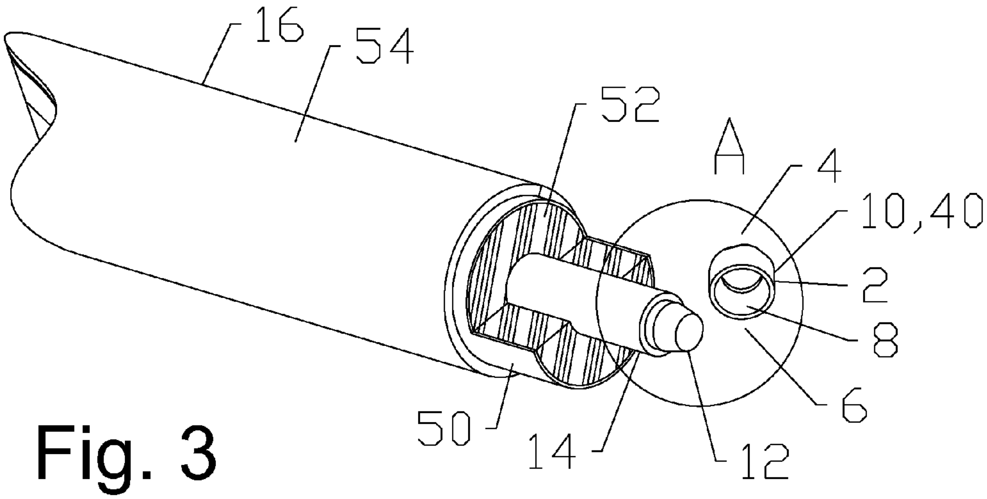
FIG. 3 is a schematic isometric view of the inner conductor cap of FIG. 1 prior to installation with a schematic isometric partially cut-away view of the coaxial cable.
Figure 4:
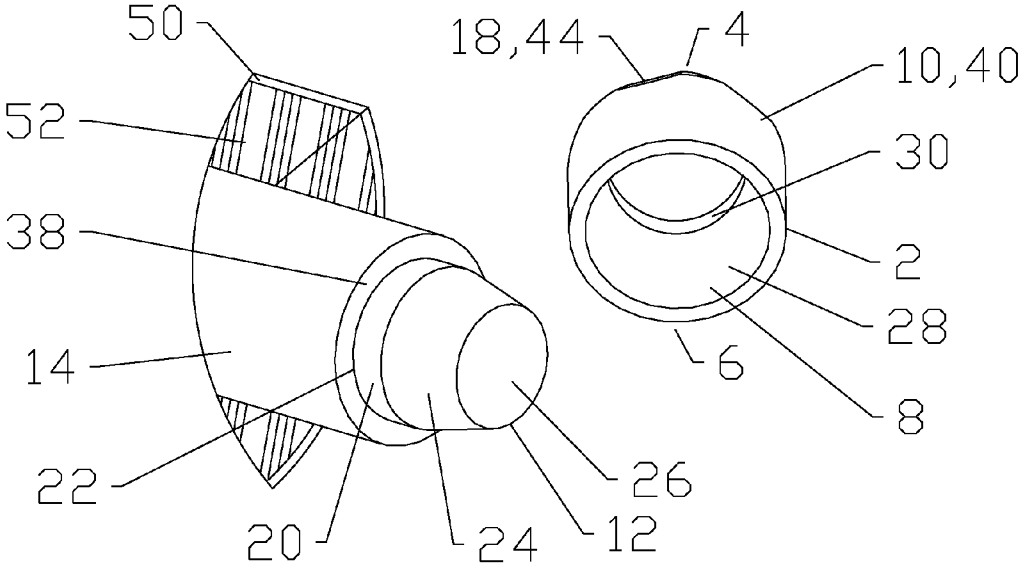
FIG. 4 is an enlarged view of area A of FIG. 3.
Figure 5:
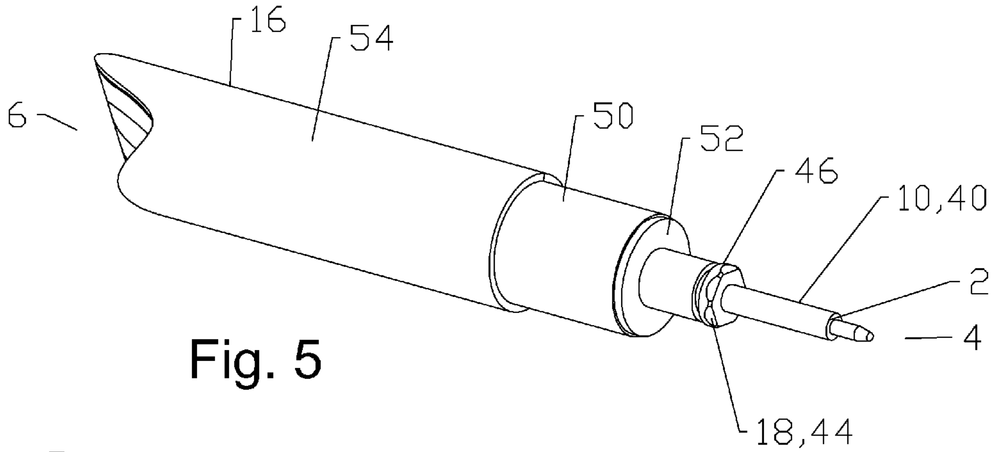
FIG. 5 is a schematic isometric view of an exemplary embodiment of an inner conductor cap, with a rotation key formed as an annular flange, installed upon the prepared end of coaxial cable.
Figure 6:
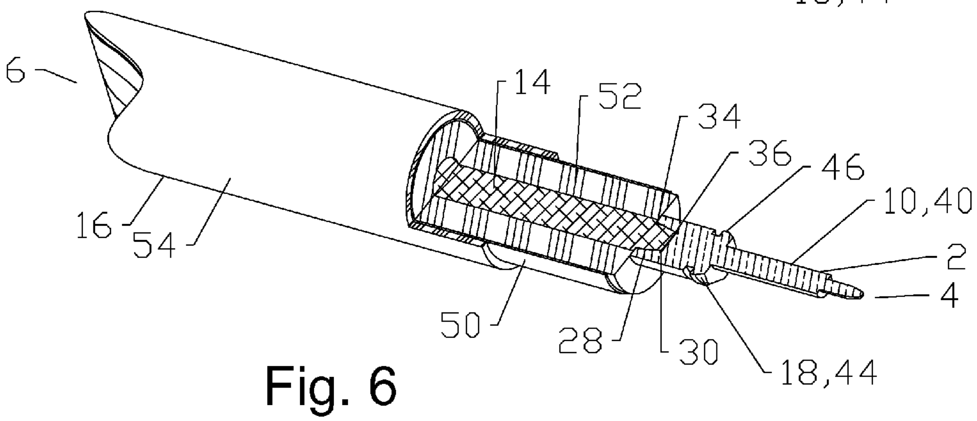
FIG. 6 is a schematic isometric partial cross-section view of FIG. 5.
Figure 7:
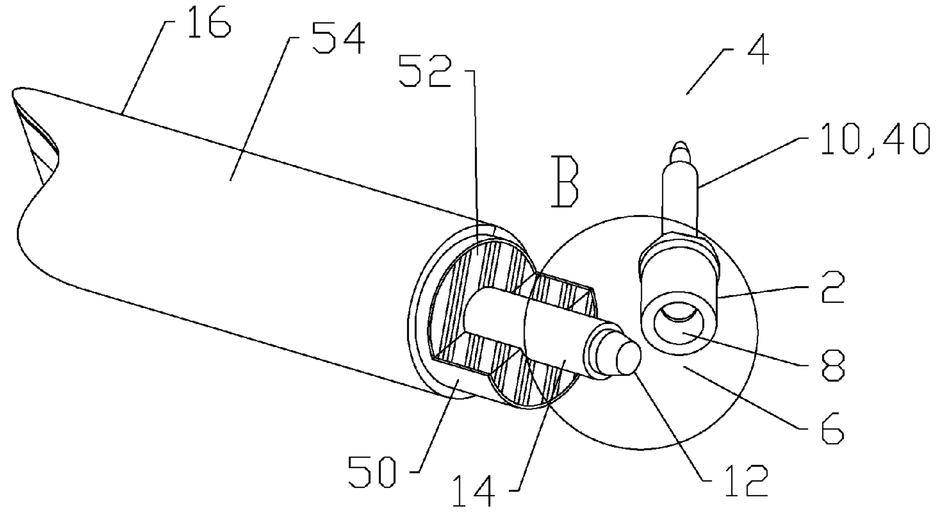
FIG. 7 is a schematic isometric view of the inner conductor cap of FIG. 5 prior to installation with a schematic isometric partially cut-away view of the coaxial cable.
Figure 8:
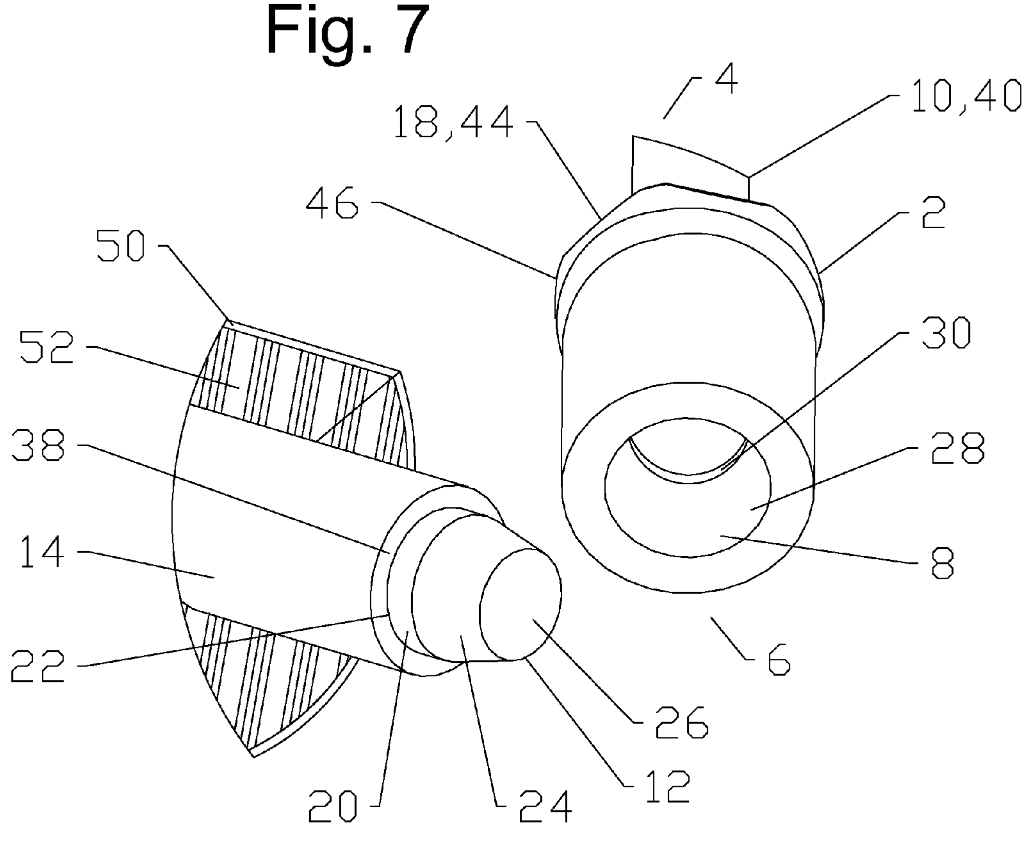
FIG. 8 is an enlarged view of area B of FIG. 7.
Figure 9:
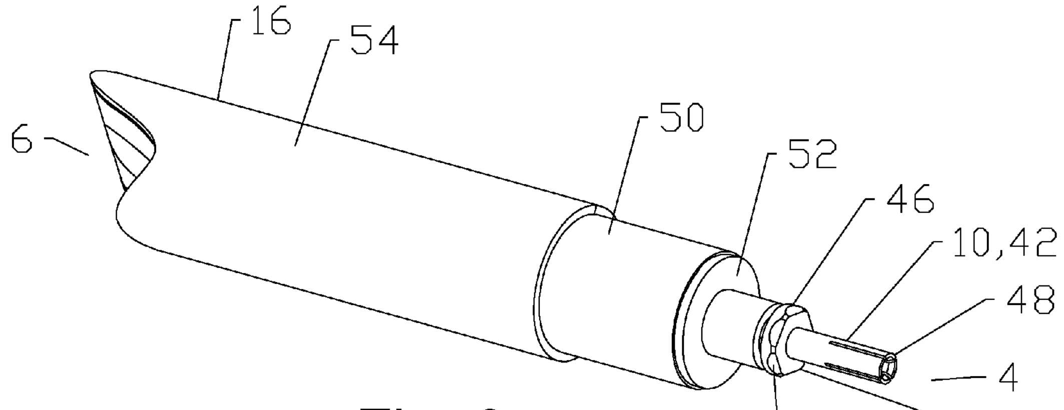
FIG. 9 is a schematic isometric view of an exemplary embodiment of a connection socket inner conductor cap, with a rotation key formed as an annular flange, installed upon the prepared end of coaxial cable.
Figure 10:
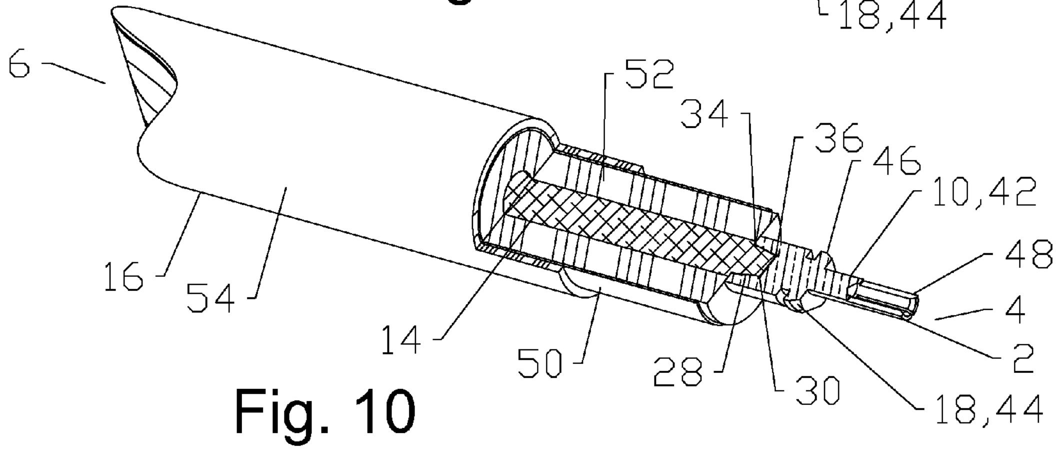
FIG. 10 is a schematic isometric partial cross-section view of FIG. 9.
Figure 11:
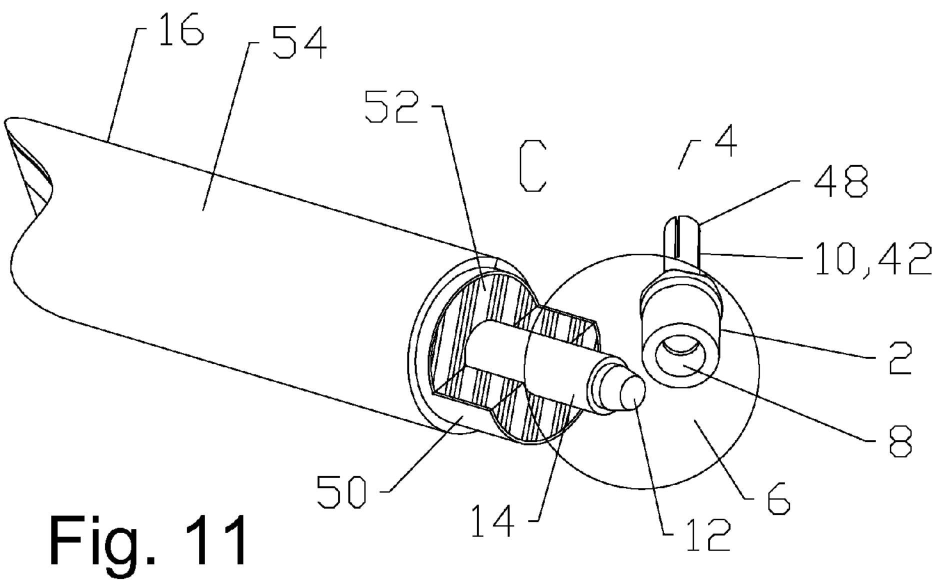
FIG. 11 is a schematic isometric view of the inner conductor cap of FIG. 9 prior to installation with a schematic isometric partially cut-away view of the coaxial cable.
Figure 12:
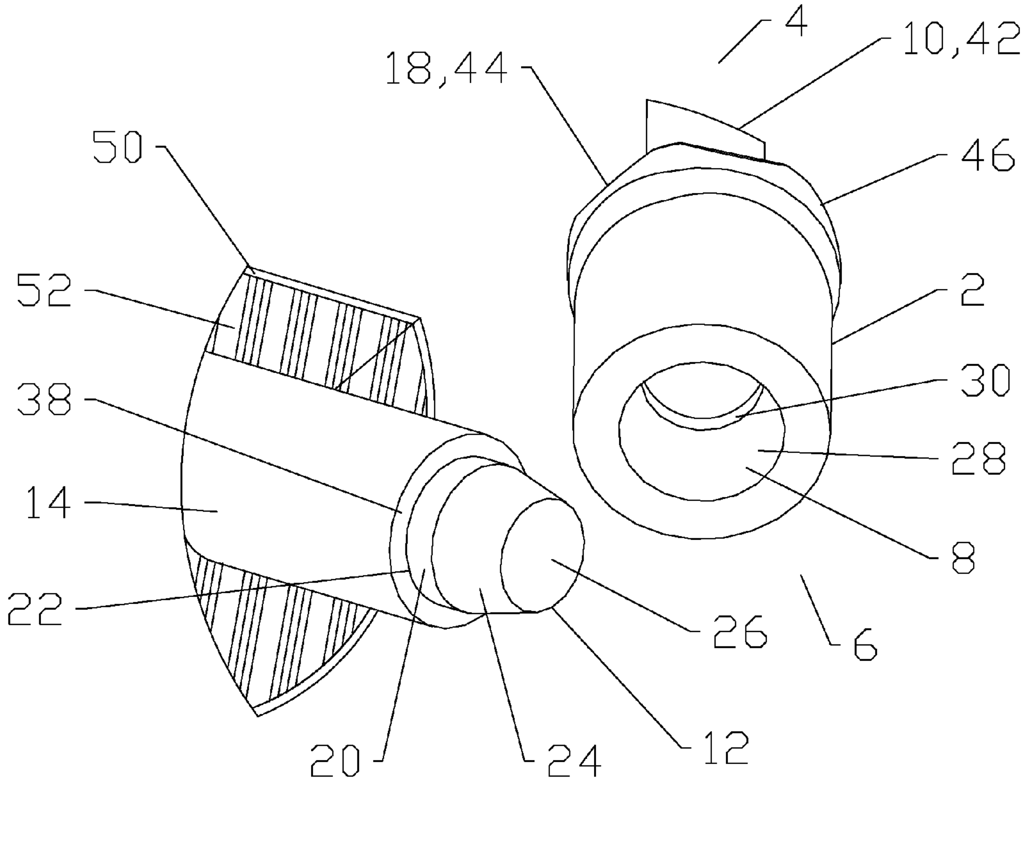
FIG. 12 is an enlarged view of area C of FIG. 11.
Figure 13:
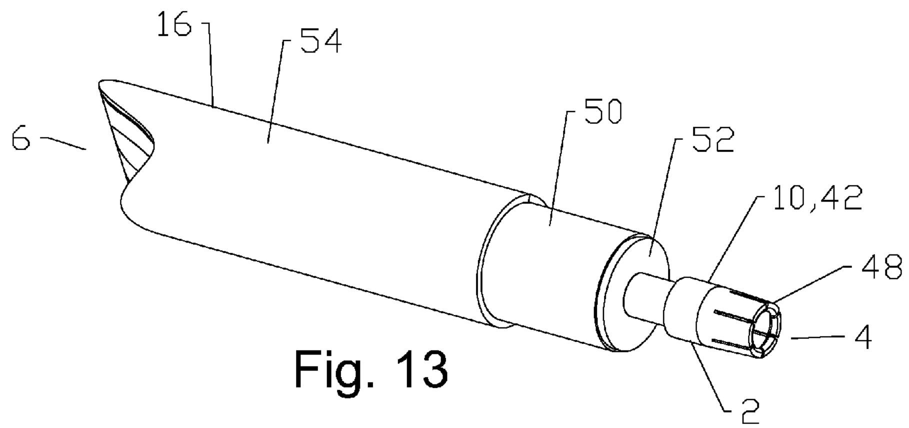
FIG. 13 is a schematic isometric view of an exemplary embodiment of a connection socket inner conductor cap, a rotation key within the connection socket, installed upon the prepared end of coaxial cable.
Figure 14:
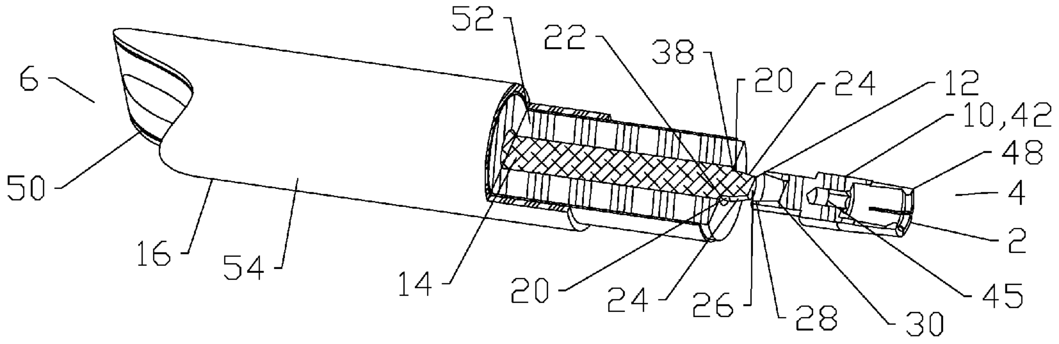
FIG. 14 is a schematic isometric partial cross-section view of the inner conductor cap of FIG. 13 prior to installation upon the prepared end of coaxial cable, the inner conductor cap being aligned for interconnection.
Figure 15:
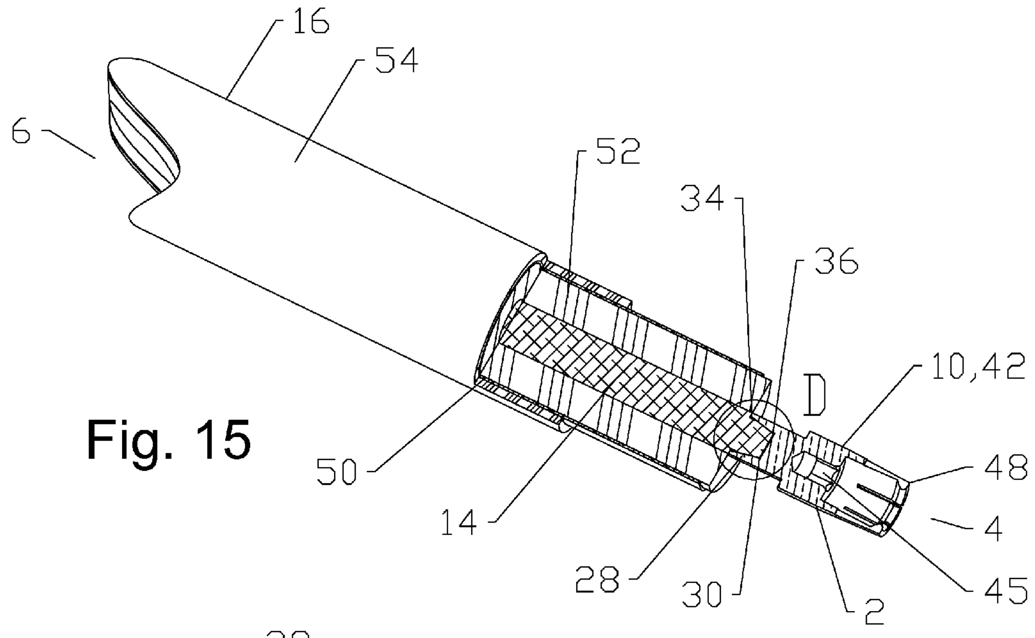
FIG. 15 is a schematic isometric partial cross-section view of FIG. 13.
Figure 16:
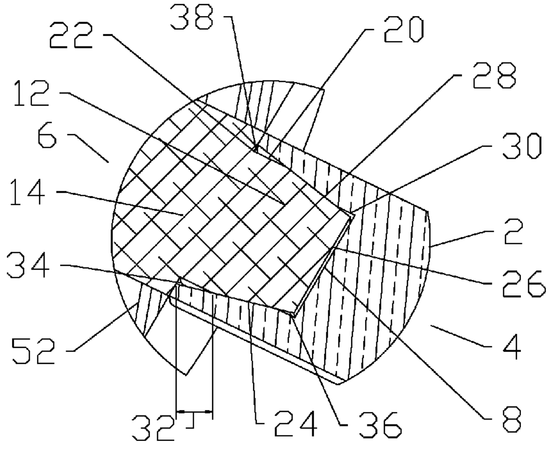
FIG. 16 is an enlarged view of Area D of FIG. 14.
Figure 17:
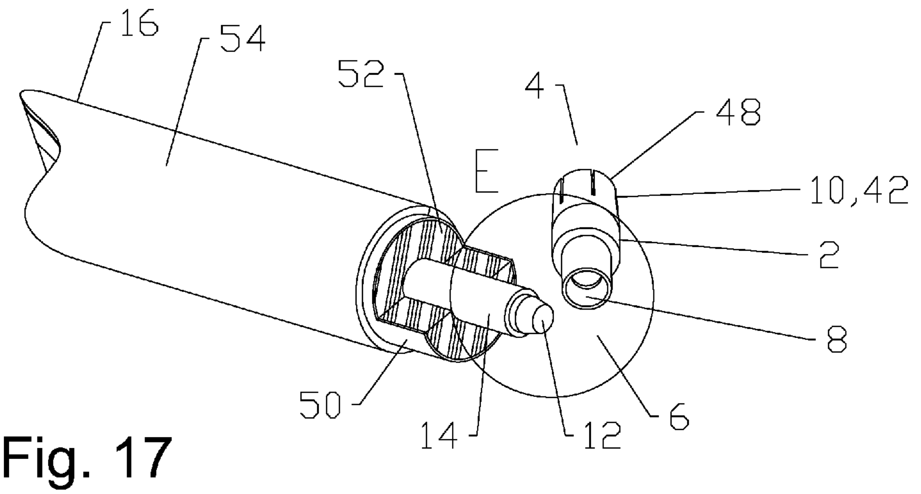
FIG. 17 is a schematic isometric view of the inner conductor cap of FIG. 13 prior to installation with a schematic isometric partially cut-away view of the coaxial cable.
Figure 18:
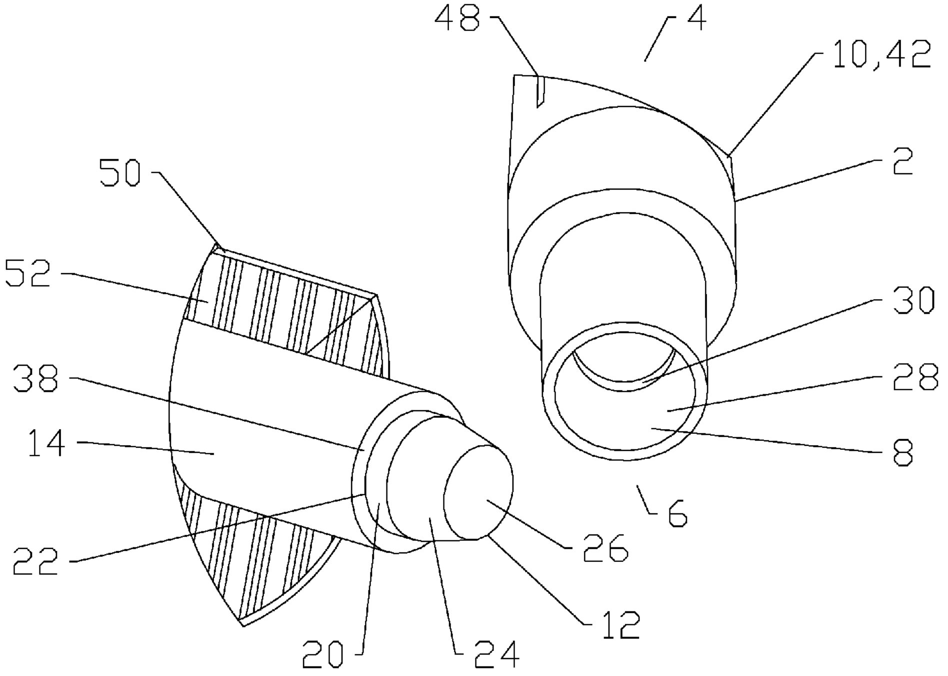
FIG. 18 is an enlarged view of area E of FIG. 17.

As shown in FIGS. 1-18, exemplary embodiments of an inner conductor cap 2 are provided with an inner conductor socket 8 at the cable end 6 and an inner conductor interface 10 at the connector end 4. The inner conductor socket 8 may be dimensioned to mate with a prepared end 12 of an inner conductor 14 of a coaxial cable 16. At least one material gap, further described in detail here below, may be provided between a sidewall of the inner conductor socket 8 and an outer diameter surface of the prepared end 12 when the inner conductor cap 2 is mated with the prepared end 12. A rotation key 18 is provided dimensioned to mate with a tool for rotating the inner conductor cap, for interconnection via friction welding.

One skilled in the art will appreciate that connector end 4 and cable end 6 are applied herein as identifiers for respective ends of both the inner conductor cap 2 and also of discrete elements of the inner conductor cap 2 described herein, to identify same and their respective interconnecting surfaces according to their alignment along a longitudinal axis of the inner conductor cap 2 between a connector end 4 and a cable end 6.

The inner conductor cap 2 may be formed from a metal and/or metal alloy such as aluminum, brass, phosphor bronze or copper. The use of metals other than aluminum may, in part, avoid difficulties found in the prior art, discussed above, and/or satisfy end user requirements for specific materials for the contact surfaces of the resulting inner conductor interface 10.

The prepared end 12 of the inner conductor 14 may be dimensioned with a diameter less than the diameter of the inner conductor 14, for example with a cylindrical portion 20 proximate a prepared end base 22 and a conical portion 24 proximate a leading end 26 of the prepared end 12. One skilled in the art will appreciate that the prepared end 12 may, alternatively, be entirely conical, cylindrical or another configuration dimensioned to mate with the desired inner conductor socket 8 resulting in at least one material gap therebetween when the inner conductor cap 2 is seated upon the prepared end 12. Where the inner conductor 14 has a hollow configuration, an inward projecting plug portion may be applied to the center of the inner conductor socket 8, the inward projecting plug portion dimensioned to seat within the hollow inner conductor when the inner conductor cap 2 is seated upon the prepared end 12.

As demonstrated in the several exemplary embodiments, the inner conductor socket 8, for mating with a prepared end 12, may, for example, be provided with a conical sidewall 28 with a diameter decreasing toward the connector end 4. The inner conductor socket 8 may be also provided with a cylindrical sidewall 30 at a connector end 4 of the inner conductor socket 8. Thus, when the inner conductor 14 is inserted into the inner conductor socket 8, the cylindrical portion 20 of the prepared end 12 will, for example, mate with a base portion 32 of the conical sidewall 28. Similarly, the conical portion 24 of the prepared end 12 will, for example, mate with the conical sidewall 28 at a connector end 4 of the conical sidewall 28 and the cylindrical sidewall 30.

The at least one material gap may, for example, be a cable end material gap 34 and/or a connector end material gap 36. Where cylindrical and/or conical mating surfaces are applied, the resulting material gap(s) may be annular. The cable end material gap 34 may be formed between the base portion 32 of the conical sidewall 28, the cylindrical portion 20 and a shoulder 38 of the inner conductor 14. Similarly, the connector end material gap 36 may be formed between the cylindrical sidewall 30 and the conical portion 24.

The inner conductor interface 10 may, for example, be a male protrusion 40 extending axially toward the connector end 4, as shown in FIGS. 1-8, or a female socket 42, as shown in FIGS. 9-18, dimensioned to mate with a corresponding male inner conductor connector interface. For an inner conduct cap 2 provided with a male protrusion 40, as shown in FIGS. 1-4, the rotation key 18 may be provided with a tool face, such as a slot, aperture, plurality of facets 44 on an outer surface of the male protrusion 40 or the like. The rotation key 18 may, alternatively, as shown in FIGS. 5-8, be an annular protrusion 46 extending radially from an outer surface of the inner conductor cap 2 proximate the cable end 6 of the male protrusion 40. The annular protrusion 46 may be similarly provided with facets 44 or other tool face(s) dimensioned to mate with a corresponding tool for rotating the inner conductor cap 2 during friction welding interconnection.

Where the desired inner conductor interface 10 is a female socket 42, the female socket 42 may, as shown in FIGS. 9-18, be provided as spring basket 48. For an inner conductor cap 2 provided with a spring basket 48, as shown in FIGS. 9-12, the rotation key 18 may be provided as, for example, the slots defining the spring basket 48 and/or an annular protrusion 46 extending radially from an outer surface of the inner conductor cap 2 proximate the cable end 6 of the female socket 42. The annular protrusion 46 may be provided with facets 44 or other tool face dimensioned to mate with a tool for rotating the inner conductor cap. The rotation key 18 may, alternatively, as shown in FIGS. 13-18, be, for example, a rotation socket 45 provided within the female socket 42 at the cable end 6 of the female socket 42 dimensioned to mate with a corresponding tool for rotating the inner conductor cap 2.

Whether utilized as the rotation key 18 or not, an annular protrusion 46 may also provide a surface for impedance matching tuning between the inner conductor 14, the selected inner connector interface 10 and the selected surrounding connector body (not shown) of the resulting coaxial connector.

Prior to interconnection via friction welding the coaxial cable 16 may be prepared by removing a portion of an outer conductor 50 of the coaxial cable 16 so that the inner conductor 14 extends therefrom, removing a portion of a dielectric material 52 between the inner conductor 14 and the outer conductor 50, and stripping back a portion of a jacket 54 from the outer conductor 50. The portion of the inner conductor 14 exposed may be prepared to form a prepared end 12 dimensioned to mate with the inner conductor socket 8. This may be done, for example, by grinding the inner conductor 14. In this way, the prepared end 12 may be provided, for example, with the desired, for example, conical portion 24 and/or a cylindrical portion 20.

In a method of friction welding, also known as spin welding, where rotation of one of the to be joined parts (an inner conductor cap 2, for example as shown in the exemplary embodiments of FIGS. 1-18) is applied to an inner conductor 14, inner conductor socket 8 is seated upon prepared end 12 of the inner conductor 14. The inner conductor cap 2 is rotated, for example at a speed of 250 to 500 revolutions per minute, about a longitudinal axis of the prepared end 12, via the rotation key 18, while applying longitudinal force driving the inner conductor socket 8 against the prepared end 12.

Rotation and longitudinal force are applied until the prepared end 12 of the inner conductor 14 and/or corresponding surfaces of the inner conductor socket 8 are plasticized sufficiently to create a friction weld between the inner conductor 14 and the inner conductor cap 2. A material interflow between the corresponding surfaces may flow into and fill or partially fill the material gap(s).

Alternatively, friction welding utilizing ultrasonic vibration, such as torsional vibration, may be applied. In torsional vibration ultrasonic type friction welding, a torsional vibration is applied to the interconnection via a sonotrode applied to the inner conductor cap 2, while the coaxial cable 16 and the inner conductor 14 therewithin are held static. The torsional vibration similarly generates a friction heat which plasticizes the contact surfaces between the prepared end 12 and the inner conductor socket 8. Where torsional vibration ultrasonic type friction welding is utilized, a suitable frequency and torsional vibration displacement, instead of rotation, for example between 20 and 40 KHz and 20-35 microns may be applied.

Because the localized abrasion of the friction welding process can break up any aluminum oxide surface coatings in the immediate weld area, no additional care may be required with respect to removing or otherwise managing the presence of aluminum oxide on the interconnection surfaces.

One skilled in the art will appreciate that the inner conductor cap and interconnection method disclosed may have significant material cost efficiencies and may provide a permanently sealed inner conductor to inner contact interconnection with reduced size and/or weight requirements.

Table of Parts

| | |
|---|---|
| 2 | inner conductor cap |
| 4 | connector end |
| 6 | cable end |
| 8 | inner conductor socket |

-continued

Table of Parts

| | |
|---|---|
| 10 | inner conductor interface |
| 12 | prepared end |
| 14 | inner conductor |
| 16 | coaxial cable |
| 18 | rotation key |
| 20 | cylindrical portion |
| 22 | prepared end base |
| 24 | conical portion |
| 26 | leading end |
| 28 | conical sidewall |
| 30 | cylindrical sidewall |
| 32 | base portion |
| 34 | cable end material gap |
| 36 | connector end material gap |
| 38 | shoulder |
| 40 | male protrusion |
| 42 | female socket |
| 44 | facet |
| 45 | rotation socket |
| 46 | annular protrusion |
| 48 | spring basket |
| 50 | outer conductor |
| 52 | dielectric material |
| 54 | jacket |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. An inner conductor cap with a connector end and a cable end for coupling with a prepared end of an inner conductor of a coaxial cable, the inner conductor cap comprising: an inner conductor interface at the connector end; an inner conductor socket open to the cable end; the prepared end is provided with a diameter less than a diameter of the inner conductor; the inner conductor socket provided with a conical sidewall, the conical sidewall provided with a diameter decreasing toward the connector end, and a cylindrical sidewall at a connector end of the inner conductor socket; the conical sidewall dimensioned to mate with a conical portion of the prepared end; whereby a material gap is formed between the cylindrical sidewall of the inner conductor socket and the conical portion of the prepared end when the inner conductor cap is mated with the prepared end; and a rotation key for rotating the inner conductor cap.

2. The inner conductor cap of claim 1, wherein the material gap is annular.

3. The inner conductor cap of claim 1, wherein a cylindrical portion of the prepared end is proximate a prepared end base dimensioned to mate with a base portion of the conical sidewall; a conical portion of the prepared end is proximate a leading end of the prepared end dimensioned to mate with the conical sidewall at a connector end side of the conical sidewall; and the material gap is formed between the base portion, the cylindrical portion and a shoulder of the inner conductor.

4. The inner conductor cap of claim 1, further including a cylindrical sidewall at a connector end of the inner conductor socket; a cylindrical portion of the prepared end is proximate a prepared end base dimensioned to mate with a base portion of the conical sidewall; the conical portion of the prepared end is proximate a leading end of the prepared end dimensioned to mate with the conical sidewall at a connector end side of the conical sidewall and the cylindrical sidewall; a second material gap is formed between the base portion, the cylindrical portion, and a shoulder of the inner conductor.

5. The inner conductor cap of claim 1, wherein the inner conductor interface is a female socket.

6. The inner conductor cap of claim 5, wherein the female socket is a spring basket.

7. The inner conductor cap of claim 5, wherein the rotation key is within the female socket.

8. The inner conductor cap of claim 5, wherein the rotation key is an annular protrusion extending radially from an outer surface of the inner conductor cap proximate the cable end of the female socket.

9. The inner conductor cap of claim 1, wherein the inner conductor interface is a male protrusion extending axially toward the connector end.

10. The inner conductor cap of claim 9, wherein the rotation key is a plurality of facets on an outer surface of the male protrusion.

11. The inner conductor cap of claim 9, wherein the rotation key is an annular protrusion extending radially from an outer surface of the inner conductor cap proximate a cable end of the male protrusion.

* * * * *